United States Patent

Sambasivan

[11] Patent Number: 6,036,762
[45] Date of Patent: Mar. 14, 2000

[54] ALCOHOL-BASED PRECURSOR SOLUTIONS FOR PRODUCING METAL PHOSPHATE MATERIALS AND COATING

[76] Inventor: Sankar Sambasivan, 2210 W. Arthur Ave., Chicago, Ill. 60645

[21] Appl. No.: 09/225,630

[22] Filed: Jan. 5, 1999

Related U.S. Application Data

[60] Provisional application No. 60/070,527, Jan. 6, 1998.
[51] Int. Cl.⁷ .............................. C23F 11/04; C09K 15/02; C09D 5/08
[52] U.S. Cl. ................................ 106/287.18; 106/287.17; 106/14.44; 501/126; 501/127; 501/152; 501/153
[58] Field of Search .......................... 106/14.44, 287.17, 106/287.18; 561/126, 127, 152, 153

[56] References Cited

U.S. PATENT DOCUMENTS 3,963,500  6/1976  Flowers et al. .......................... 106/14
5,665,463  9/1997  Morgan et al. ......................... 442/103

*Primary Examiner*—David Brunsman
*Attorney, Agent, or Firm*—Juettner Pyle & Piontek

[57] ABSTRACT

A precursor solution for the preparation of metal phosphates is provided. Two components are prepared in which the first is a metal salt dissolved in alcohol, and the second component is phosphorous pentoxide dissolved in alcohol. The two components are mixed and may be applied as a liquid coating to a variety of substrates. The coated substrate is then heated, causing removal of all other components and leaving a layer of pure metal phosphate.

8 Claims, No Drawings

ALCOHOL-BASED PRECURSOR SOLUTIONS FOR PRODUCING METAL PHOSPHATE MATERIALS AND COATING

CROSS REFERENCE

This application claims the benefit and priority of Provisional Application, Ser. No. 60/070,527, filed Jan. 6, 1998.

BACKGROUND OF THE INVENTION

This invention relates to methods and solutions for preparing and applying metal phosphate coatings to a substrate.

Metal phosphate coatings are applied to a variety of substrates including metals and ceramics to perform a variety of useful functions, such as corrosion resistance against harsh chemical environments at elevated temperatures, as fiber coatings to provide toughening of high temperature composites, bio-active surfaces for implants, and, in general, surface modification of a substrate to obtain desirable electrical, chemical, thermal and mechanical properties. As one example, monazite or lanthanum phosphate coatings are applied to ceramic fibers and composites to provide structures for use at very high temperatures, as described in U.S. Pat. No. 5,665,463.

In general, it is known to apply a solution to a substrate containing the desired molar amounts of the metal and phosphate. The substrate is then heated to obtain a pure metal phosphate coating. In many cases, it is desired that the precursor solution have the capability of easily wetting and penetrating a substrate without separating into fractions. Another desirable property when dealing with high temperature metal phosphate coatings is the ability to convert the raw coating to the metal phosphate at relatively low temperatures, in order to minimize thermal degradation of the substrate.

Low temperature conversion to inorganic phosphate-based coatings is also desired on metal or alloy substrates for applications requiring corrosion resistance, thermal or electrical insulation, and other special properties. It is often difficult to synthesize suitable solutions with relatively inexpensive raw materials that yield the desired inorganic phase along with desirable film properties (uniform, dense, smooth and continuous). In many instances, the coatings are porous, multi-phase and require higher temperature heat treatment to obtain the desired single phase material. In applications requiring a mixed-metal phosphate-based coating (sodium zirconium phosphate, for example), the precursor solution should contain the respective metal and phosphate species to intimately mixed in order to avoid nucleation of a mixture of inorganic phases. Therefore, there is a need for developing appropriate precursor chemical solution that will yield metal or mixed-metal phosphate coatings with dense microstructure, morphology, and desired stoichiometry at relatively low temperatures.

SUMMARY OF THE INVENTION

In accordance with the present invention, a precursor solution is formed from two liquid components. The first component is a metal salt dissolved in alcohol. The second component of phosphorous pentoxide is dissolved in alcohol. The two components are then mixed together in the desired molar proportions to provide a stable precursor solution, with the phosphate portion at least partially esterfying to form a polymer-like structure which uniformly entraps the metal ion.

The solution, as such, may be heated directly to remove the alcohol portion and other species and provide a pure metal phosphate. Preferably, however, the solution is applied as a coating to a non-porous or porous substrate using any suitable method, and the coated substrate is heated, typically to a temperature of less than 600° C., to obtain a uniform and pure coating of the metal phosphate on the substrate.

A particular advantage of the present invention is that the precursor solution is highly uniform allowing a highly uniform coating of even and uniform thickness to be applied to the substrate. After initial heat treatment, subsequent coatings may be applied to increase coating thickness.

The present invention is applicable to the formation of precursor phosphate solutions containing more than one metal ion. The ability to adjust the concentration of the composite solution over a wide range is another distinct advantage, allowing for precise or controlled amounts of metal phosphates to be formed.

DETAILED DESCRIPTION

The present invention contemplates the formation of a metal phosphate precursor solution from two separate liquid components using a common organic solvent. While a variety of organic solvents may be potentially useful, liquid alcohols are preferred, such as methanol or ethanol, with ethanol being most preferred.

A first component of the precursor solution is prepared from a metal salt dissolved in alcohol such as ethanol. Metal salts which are insoluble in alcohol are unsuitable. A mixture of salts of different metals may be employed. Nitrates, chlorides, acetates or any salt of metal soluble in alcoholic media may be used.

The salt of any metal may be employed in the first component. For the preparation of coatings for use in high temperature reactive environments, reference is made to U.S. Pat. No. 5,665,463, incorporated herein by reference. The metal salt may comprise a monozite having the general formula $MPO_4$, where M is selected from the larger trivalent rare earth elements or the lanthanide series (La, Ce, Pr, Nd, Pm, Sm, Eu, Gd and Th). Xenotimes as described in the above patent can also be prepared. Other di-and tri- valent metals are also especially suitable, such as aluminum.

The second component of the precursor solution is phosphorous pentoxide ($P_2O_5$) dissolved in the same solvent such as ethanol. There is a controlled reactivity between the alcohol and phosphorous pentoxide in which phosphate esters are produced. The esterification process continues, forming ester chains while the solution ages, and the solution becomes sufficiently polymeric such that good film forming properties are attained.

The metal salt solution is preferably added to the phosphorous pentoxide solution shortly after preparation of the latter and before extensive esterification occurs. In this manner, upon mixing of the two solutions, the dissolved metal salt (metal and anion species) entraps itself into the polymeric structure, thus yielding a chemically homogenous or molecularly mixed solution. At this stage, the metal and phosphate ions remain in solution and do not combine to form the metal phosphate except upon heating.

The composite solution can be prepared at a variety of concentrations, depending on the desired film microstructure. For example, using lanthanum nitrate, a solution providing up to 160 grams per liter yield of lanthanum phosphate can be obtained. Normally, the metal salt and the phosphate are provided in the mixture in stoichiometric proportions to yield the desired metal phosphate.

The solution comprising the two components is shelf stable and can be converted to metal phosphate by heating.

Since the solution has good wetting and coating properties, however, the preferred method of employment is as a coating on porous and non-porous substrates. For example, lanthanum phosphate has substantial utility as a coating on ceramic fibers, fabrics or in other structures used at high temperatures, i.e., in excess of 1200° C. The phosphate coating allows for increased toughness for the composite as referred in U.S. Pat. No. 5,665,463. The solution may be applied as a coating on non-porous materials such as metals and metal alloys.

Upon pyrolysis of the precursor coated substrate, much of the solvent evaporates at a relatively low temperature, leaving a continuous film of residual precursor material on the substrate. Upon additional heating, all species except for metal and phosphate are removed, leaving a coating of the metal phosphate. The temperature to which heating is required may be evaluated by differential thermal analysis. For the $LaPO_4$ precursor, heating to a temperature of 600° for a brief period assures total conversion. Differential thermal analysis (room temperature to 1000° C.) of the lanthanum phosphate precursor showed only one significant exothermic peak below 250° C. suggesting crystallization of the lanthanum phosphate phase. X-ray diffraction of the film obtained confirmed the formation of a single phase lanthanum phosphate. Scanning electron microscopy analysis of the film showed it to be smooth, uniform, continuous and stoichiometric. The use of a volatile solvent system allows the metal phosphate to form at relatively low temperatures.

In further illustration of the present invention, the following examples are given:

EXAMPLE I

For preparing a 80 g/l of the monazite precursor solution (80 grams of monazite yield from one liter of solution), 37.02 grams of lanthanum nitrate $(La(NO_3)_3 \cdot 6\ H_2O)$ was dissolved in 150 ml of ethanol in one beaker. In a separate beaker, 6.07 grams of $P_2O_5$ was dissolved in 100 ml of ethanol. Once $P_2O_5$ was dissolved, the lanthanum nitrate solution was added to the $P_2O_5$-containing solution and the mixture was stirred for several minutes to obtain a 250 ml monazite precursor solution that can be used to produce lanthanum phosphate. Alumina-based substrates (plates, monofilaments, fiber tows and fabrics), as an example of refractory reinforcement material for ceramic matrix composites, dip-coated with the aforementioned solution, dried at room temperature and subsequently heat treated at 600 degrees Celsius yields a uniform and continuous coating of monazite or lanthanum phosphate. X-ray diffraction analysis of the coating confirmed the presence of pure monazite phase material. SEM analysis of the coating on sapphire monofilaments showed the coating to be dense, uniform, and continuous with a smooth morphology. Ceramic fiber tows (Nextel 720, trade name, 3M) were continuously coated using the aforementioned precursor solution to obtain monazite coatings that showed virtually no strength degradation up to 800 degrees celsius. Transmission electron microscopy analysis of the coating revealed a continuous and relatively uniform coating across the tow of fibers with little or no fiber bridging. It is worthwhile to note that among twelve different precursor solution chemistries evaluated by a federal laboratory, the aforementioned precursor solution was rated the most superior in yielding monazite coatings.

EXAMPLE II

Using similar procedures, precursor solution containing aluminum and phosphate ions was developed. Aluminum phosphate-based materials may be used as matrix materials for composite applications. 168.4 grams of aluminum nitrate $(Al(NO_3)_3 \cdot 9\ H_2O)$ was dissolved in 280 ml of ethanol in one beaker. In another container, 27.62 grams of $P_2O_5$ was dissolved in 120 ml ethanol. After $P_2O_5$ was dissolved, the two solutions were mixed and stirred for several minutes to obtain a 400 ml aluminum phosphate-based precursor solution. A fibrous preform containing unidirectional fiber tows of extel 720 (3M trade name) was initially infiltrated with an alumina slurry and subsequently with the aluminum phosphate-based precursor solution to obtain a dense matrix (residual porosity of 10% or less) in the composite consisting of alumina and aluminum phosphate-based material. The content of aluminum phosphate-based matrix material in the composite amounted to 15 wt %.

I claim:

1. A precursor solution for preparing metal phosphate said solution comprising a mixture of a metal salt dissolved in alcohol and phosphorous pentoxide dissolved in alcohol.

2. The solution of claim 1 wherein said alcohol is ethanol.

3. The solution of claim 1 wherein said salt is a nitrate.

4. The solution of claim 1 wherein said metal salt is lanthanum.

5. The solution of claim 1 wherein the metal is aluminum.

6. The solution of claim 1 wherein said solution is converted to a metal phosphate upon heating.

7. Method of applying a metal phosphate to a substrate, said method comprising the steps of preparing a precursor solution for a mixture of components comprising a metal salt dissolved in alcohol and phosphorous pentoxide dissolved in alcohol, applying said precursor solution to said substrate to form a metal phosphate.

8. A method for preparing a precursor solution for the formation of a metal phosphate, said method comprising the steps of preparing a first component comprising the steps of preparing a first component comprising a solution of an alcohol solvent and a metal salt soluble in said alcohol, preparing a second component comprising phosphorous pentoxide dissolved in alcohol wherein said alcohol becomes at least partially esterfied, and then mixing the first and second components together.

* * * * *